United States Patent [19]

Shimizu

[11] Patent Number: 5,242,276
[45] Date of Patent: Sep. 7, 1993

[54] MULTICYLINDER COMPRESSOR

[75] Inventor: Shigemi Shimizu, Gunma, Japan

[73] Assignee: Sanden Corporation, Gunma, Japan

[21] Appl. No.: 909,210

[22] Filed: Jul. 6, 1992

[30] Foreign Application Priority Data

Mar. 7, 1991 [JP] Japan .................. 3-059260[U]

[51] Int. Cl.$^5$ .................................................. F04B 1/12
[52] U.S. Cl. ..................................... 417/269; 137/856; 137/512.15
[58] Field of Search .......... 417/269, 570, 571, 222 R, 417/222 S; 137/856, 857, 855, 512.15, 512.4, 858, 854

[56] References Cited

U.S. PATENT DOCUMENTS

| | | | |
|---|---|---|---|
| 2,609,660 | 9/1952 | Tenney et al. | 417/269 |
| 4,061,443 | 12/1977 | Black et al. | 417/269 X |
| 4,936,754 | 6/1990 | Suzuki et al. | 417/571 X |
| 5,062,773 | 11/1991 | Kawai | 417/269 |

*Primary Examiner*—Richard A. Bertsch
*Assistant Examiner*—Roland G. McAndrews, Jr.
*Attorney, Agent, or Firm*—Baker & Botts

[57] ABSTRACT

Disclosed is a multicylinder compressor including a cylinder block having a plurality of cylinders, a valve plate provided on an end of the cylinder block and having a plurality of inlet ports and outlet ports, a cylinder head provided on the valve plate and having a partition wall defining a discharge chamber, a discharge valve member provided on the valve plate, and a valve guard member provided in the discharge chamber and restricting the separation distance of each of the plurality of discharge valves of the discharge valve member from the valve plate. The outline of the fringe of the valve guard member is formed along the inner side surface of the partition wall. The valve guard member, particularly the valve guard portions of the valve guard member, can have a high rigidity, even if the thickness of the member is small. Therefore, the compressor according to the present invention can be made to be light-weight and can be produced inexpensively.

20 Claims, 5 Drawing Sheets

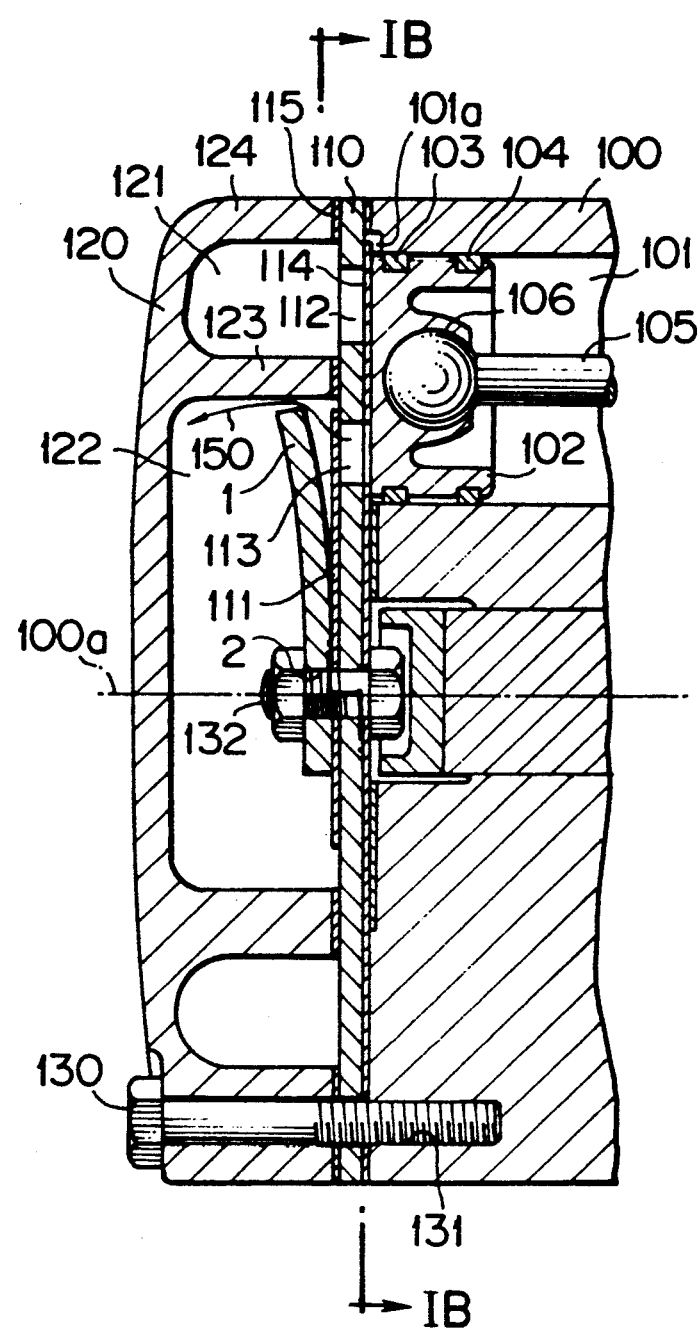
FIG. IA

FIG. IB
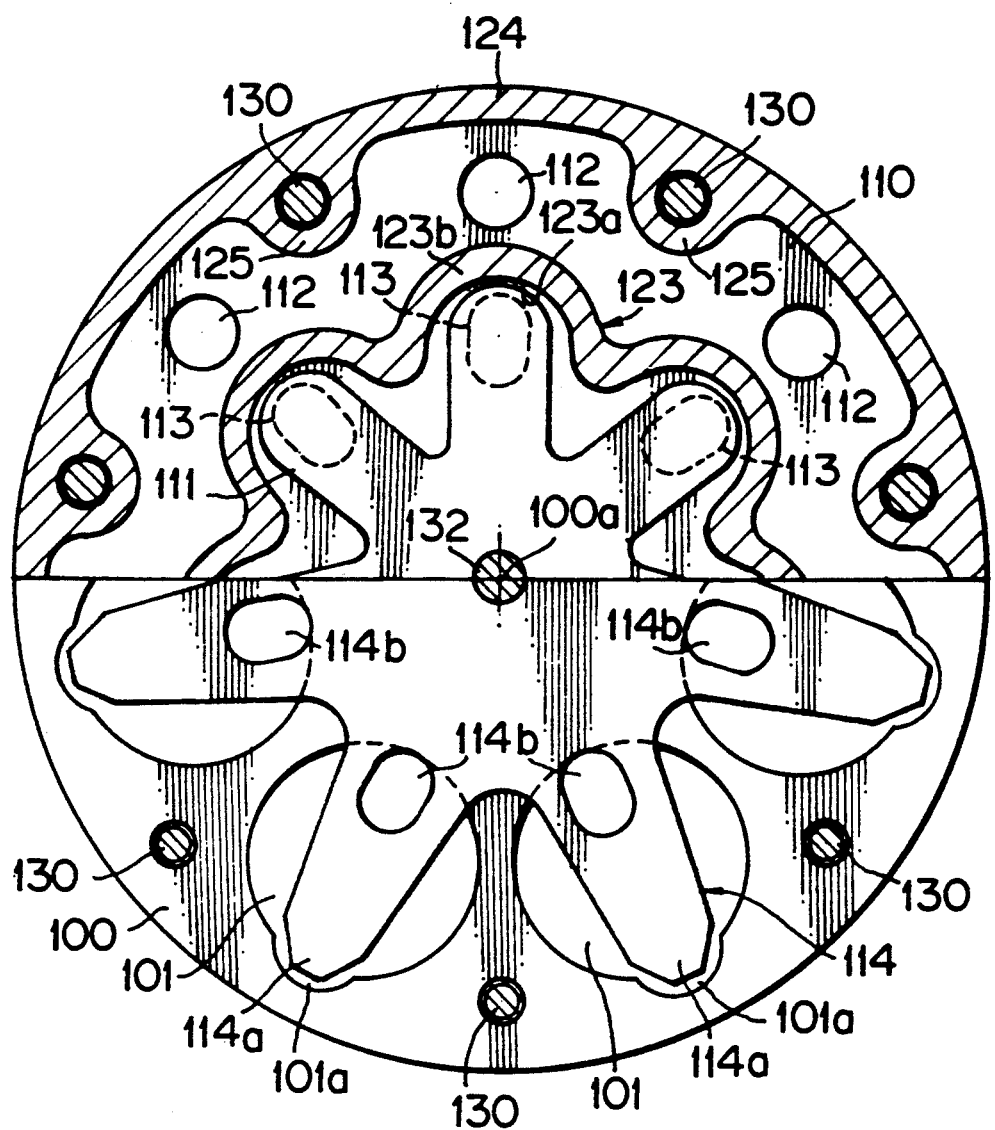

MULTICYLINDER COMPRESSOR

BACKGROUND OF THE INVENTION

1. Field of the Invention

The present invention relates to a piston type compressor, and more particularly to a multicylinder compressor in which a plurality of cylinders are arranged around an axis.

2. Description of the Prior Art

In conventional multicylinder compressors used for, for example, air conditioners, a plurality of discharge valves, provided in correspondence with the respective outlet ports of a plurality of cylinders, are integrally formed as a single plate. Each valve guard for restricting the motion of each discharge valve and protecting the discharge valve is formed usually in the same shape as that of the discharge valve.

FIGS. 4A and 4B illustrate a part of a conventional multicylinder compressor. FIG. 4B depicts a vertical section of a valve guard. In FIG. 4B, valve plate 110 having outlet ports 113 is provided on an end of a cylinder block (not shown).

Inlet valve member 114 is provided on the cylinder block side of valve plate 110. Discharge valve member 111 is provided on the cylinder head side of valve plate 110. Discharge valve member 111 has discharge valves 111a for opening and closing the respective outlet ports 113. Each discharge valve 111a is restricted in opening motion by valve guard 116a. Valve guard member 116 has a plurality of valve guards 116a by the number corresponding to the number of discharge valves 111a (outlet ports 113). Valve guard member 116 is provided in discharge chamber 122 defined by the cylinder head, particularly by inside partition plate 123 of the cylinder head. Valve guard member 116 has center hole 126 for fixing the valve guard member to valve plate 110 via a bolt (not shown). Gasket 115 seals between valve plate 110 and inside partition plate 123.

As shown in FIG. 4A, inside partition plate 123 of the cylinder head is formed as a shape having a wave line. The interior of waved inside partition plate 123 is formed as discharge chamber 122. Each of valve guards 116a of valve guard member 116 radially extends from the center of the member toward each of inner side surfaces 123a of projecting portions 123b of waved inside partition plate 123. Discharge valve member 111 has substantially the same shape as that of valve guard member 116. Each valve guard 116a extends straightly from the central portion of valve guard member 116, and only the tip portion of the valve guard 116a is shaped along each inner side surface 123a of projecting portion 123b of waved inside partition plate 123 with a substantially constant distance. Therefore, the distance between each constriction portion 116b of valve guard member 116 and the inner side surface of waved inside partition plate 123 is greater than the distance between the tip portion of each valve guard 116a and each inner side surface 123a of projecting portion 123b.

As shown in FIG. 4B, valve guard 116a is curved such that the separation distance of the valve guard from valve plate 110 becomes larger as the valve guard extends outwardly.

In such a conventional multicylinder compressor, the shape of discharge valve member 111 is designed in consideration of the rigidity of delivery valves 111a so as to decrease fluid loss through the discharge valves 111a small. Valve guard 116a is curved in vertical section to restrict the motion of discharge valve 111a and to aim the relaxation of stress of the restricted discharge valve 111a. And valve guard member 116 is star-shaped as described above. Therefore, valve guard 116a is relatively flexible similar to the discharge valve 111a. To increase the rigidity of valve guard 116a, each valve guard 116a and valve guard member 116 must be thick. In such a manner, however, the total weight and the cost of the compressor increase.

SUMMARY OF THE INVENTION

Accordingly, an object of the present invention is to provide a multicylinder compressor of which discharge valves can have a high rigidity without thickening them, and which can be light and low in cost.

To achieve this object, a multicylinder compressor according to the present invention is herein provided. The multicylinder compressor includes a cylinder block having a plurality of cylinders arranged in parallel to each other, a valve plate provided on an end of the cylinder block and a cylinder head provided on the valve plate. The valve plate includes a plurality of outlet ports discharging a compressed fluid from the plurality of cylinders. The cylinder head has a partition wall defining a discharge chamber. A discharge valve member is provided on the valve plate. The discharge valve member has a plurality of discharge valves each covering each of the plurality of outlet ports to open and close each of the plurality of outlet ports. A valve guard member is provided in the discharge chamber. The valve guard member restricts the separation distance of each of the plurality of discharge valves from the valve plate. The outline of the fringe of the valve guard member is formed along the inner side surface of the partition wall.

In the multicylinder compressor according to the present invention, the outline of the fringe of the valve guard member is formed along the inner side surface of the partition wall along the entire length of the fringe of the valve guard member.

Therefore, each constriction portion between adjacent valve guards formed on the valve guard member is also shaped along the inner side surface of the partition wall. The rigidity of each valve guard can be increased without thickening the valve guard member, because the constrictions on both sides of the valve guard are less than those in the conventional multicylinder compressors. As a result, the thickness of the valve guard member may be small. The multicylinder compressor can be made light-weight and produced inexpensively.

Preferred exemplary embodiments of the invention will now be described with reference to the accompanying drawings, which are given by way of example only, and are not intended to limit the present invention.

BRIEF DESCRIPTION OF THE DRAWINGS

FIG. 1A is a vertical sectional view of a part of a multicylinder compressor according to an embodiment of the present invention.

FIG. 1B is a schematic cross-sectional view of the multicylinder compressor shown in FIG. 1A, taken along 1B—1B line of FIG. 1A.

DETAILED DESCRIPTION OF THE PREFERRED EMBODIMENTS OF THE INVENTION

Figure 2A:
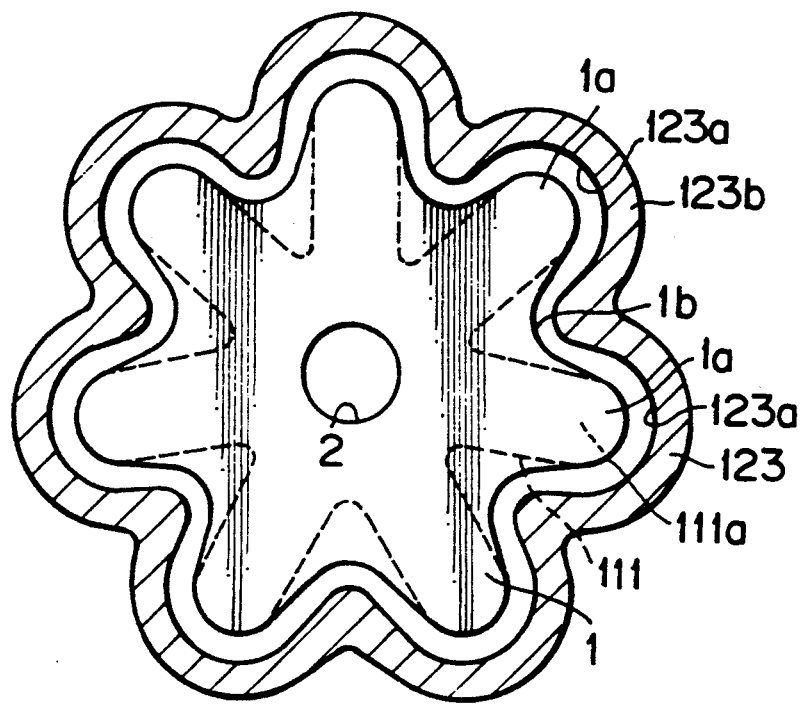
FIG. 2A is a schematic cross-sectional view of a part of the multicylinder compressor shown in FIG. 1A, showing the plane structure of a valve guard member of the compressor.

FIGS. 1A to 2B illustrate a multicylinder compressor according to an embodiment of the present invention. FIGS. 1A and 1B illustrate the end portion of cylinder block 100 and cylinder head 120.

Cylinder block 100 has a plurality of cylinders 101 (in this embodiment; seven cylinders) arranged parallel to each other around a center axis 100a. Valve plate 110 is provided on an end of cylinder block 100. Valve plate 110 has a plurality of inlet ports 112 through which a fluid is introduced into the respective cylinders 101 and a plurality of outlet ports 113 through which the fluid compressed in the respective cylinders 101 is discharged from the respective cylinders. Inlet valve member 114 is provided between the end of cylinder block 100 and valve plate 110. Cylinder head 120 is mounted on valve plate 110 via gasket 115. Cylinder head 120 is fixed to cylinder block 100 by bolts 130 screwed into tapped holes 131 of the cylinder block via valve plate 110 and gasket 115. The through holes for bolts 130 are defined in boss portions 125 formed on outer partition wall 124 of cylinder head 120 at the respective portions between adjacent cylinders 101. Suction chamber 121 and discharge chamber 122 are formed in cylinder head 120. Suction chamber 121 is defined by outer partition wall 124 and inner partition wall 123 of cylinder head 120. Discharge chamber 122 is defined by inner partition wall 123 of cylinder head 120. Discharge valve member 111 is provided on valve plate 110 in discharge chamber 122. Valve guard member 1 is provided on discharge valve member 111 in discharge chamber 122. Valve guard member 1 is fixed to valve plate 110 by bolt 132 inserted through center hole 2 of the valve guard member.

Piston 102 is slidably inserted of valve guard member 101. Piston rings 103 and 104 are fitted on the periphery of piston 102. Connecting rod 105 is pivotably connected to boss portion 106 of piston 102. Inlet valve member 114 has inlet valves 114a radially extending which open and close the respective inlet ports 112, and through holes 114b at the positions corresponding to the respective outlet ports 113. Groove 101a is formed on the periphery of each cylinder 101 at the radially outermost position and at the end of cylinder block 100. Groove 101a restricts the opening motion of inlet valve 114a by engaging the tip portion of the inlet valve.

Figure 2B:
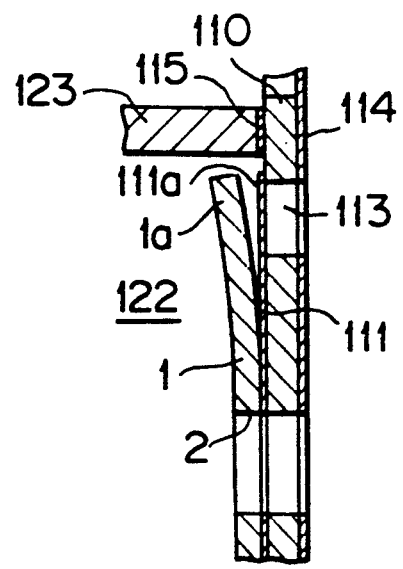
FIG. 2B is a partial vertical sectional view of the multicylinder compressor shown in FIG. 2A, showing the structure of the vertical section of the valve guard member of the compressor.

FIGS. 2A and 2B illustrate discharge valve member 111, valve guard member 1 and inner side wall 123 of cylinder head 120. Discharge valve member 111 has discharge valves 111a radially extending which open and close the respective outlet ports 113. Valve guard member 1 has a plurality of valve guards 1a radially extending by the number corresponding to the number of discharge valves (seven valve guards). Each valve guard 1a is curved in vertical section so as to be separated from valve plate 110 as radially extended. Each valve guard 1a restricts the separation distance (opening motion) of corresponding delivery valve 111a from valve plate 110. Inner partition wall 123 is formed in plane as a waved shape as shown in FIG. 2A. Respective curved projection portions 123b are formed on inner partition wall 123 at the positions corresponding to those of cylinders 101 (outlet ports 113). The outline of the fringe of valve guard member 1 is formed along waved inner side surface 123a of inner partition wall 123. In this embodiment, the outline of the fringe of valve guard member 1 is formed along, or follows, the waved inner side surface 123a of inner partition wall 123 such that the distance between the outline of the fringe and the inner side surface is maintained as a constant distance. The outline of the fringe of valve guard member 1 may be formed analogous to the shape defined by waved inner side surface 123a of inner partition wall 123, or substantially parallel to the inner side surface 123a.

In the multicylinder compressor constructed above, piston 102 is reciprocally driven. A fluid is sucked from suction chamber 121 into cylinder 101 through inlet port 112 and opened inlet valve 114a when piston 102 is moved toward right side of FIG. 1A. The fluid introduced into cylinder 101 is compressed in cylinder 101 by piston 102 moving toward left side of FIG. 1A. The compressed fluid is discharged from cylinder 101 to discharge chamber 122 through outlet port 113 and opened discharge valve 111a when piston 102 is moved toward left side of FIG. 1A, as shown by arrow 150 in FIG. 1A.

Figure 4A:
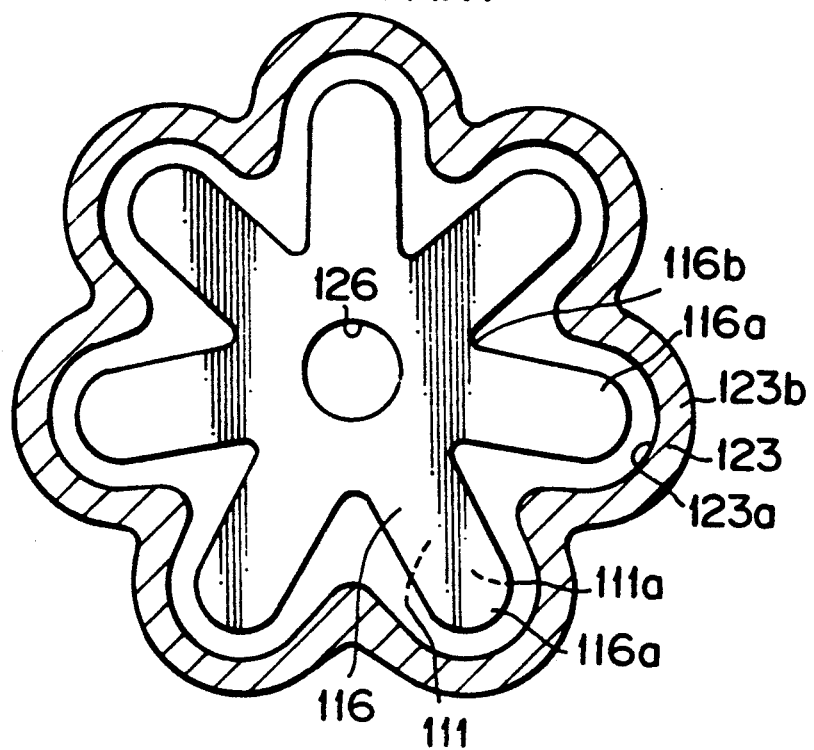
FIG. 4A is a schematic cross-sectional view of a part of a conventional multicylinder compressor, showing the plane structure of a valve guard member of the compressor.
Figure 4B:
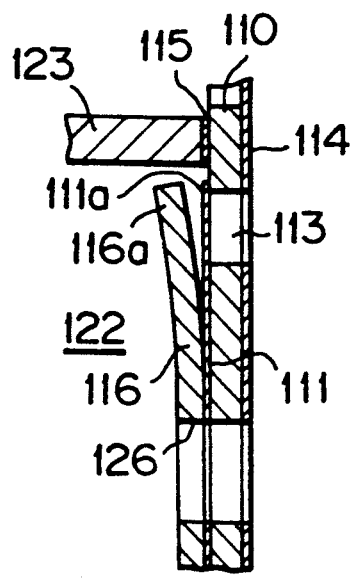
FIG. 4B is a partial vertical sectional view of the multicylinder compressor shown in FIG. 3A, showing the structure of the vertical section of the valve guard member of the compressor.

As shown in FIG. 2A, the outline of the fringe of valve guard member 1 extends along waved inner side surface 123a of inner partition wall 123, maintaining a constant distance between the outline of the fringe and the inner side surface. Therefore, even in constriction portion 1b between adjacent valve guards 1a, the constant distance is maintained. As a result, the degree of the constriction of constriction portion 1b is small as compared with the constriction portion 116b in the conventional multicylinder compressor, as shown in FIG. 4A.

Thus, the length of the minimum radius of the valve guard member 1 is greater than one-half of the length of the maximum radius of the valve guard member 1. Any angle formed by the outline of the fringe of the valve guard member is greater than 90 degrees. Accordingly, the rigidity of each valve guard 1a can be maintained sufficiently high even if the thickness of the valve guard 1a is less than that in the conventional multicylinder compressor. The compressor according to the present invention can be made to be light-weight and can be produced inexpensively as compared with conventional multicylinder compressors.

Figure 3:
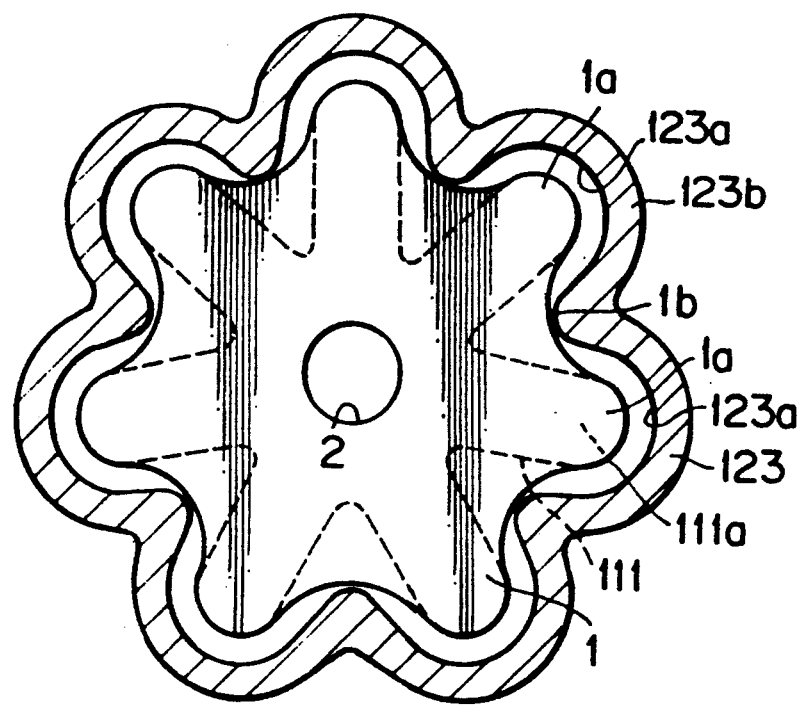
FIG. 3 is a schematic cross-sectional view of a part of the multicylinder compressor according to another embodiment of the present invention, showing the plane structure of a valve guard member of the compressor.

FIG. 3 illustrates another embodiment of the present invention. In this embodiment, each constriction portion 1b of valve guard member 1 is closer to waved inner side surface 123a of inner partition wall 123, as compared with the above embodiment. Thus, constriction portion 1b of valve guard member 1 may be close to the inner side surface 123a of inner partition wall 123, unless the constriction portion 1b comes into contact with the inner side surface 123a. Since the degree of the constriction of constriction portion 1b can be smaller, the rigidity of each valve guard 1a can be more increased.

Although several preferred embodiments of the present invention have been described in detail herein, it will be appreciated by those skilled in the art that various modifications can be made without materially departing from the novel and advantageous teachings of the invention. Accordingly, the embodiments disclosed herein are by way of example. The scope of the invention is defined by the claims annexed hereto and forming a part of this application.

What is claimed is:

1. In a multicylinder compressor comprising a cylinder block having a plurality of cylinders arranged parallel to each other, a valve plate provided on an end of said cylinder block, said valve plate including a plurality of outlet ports for discharging a compressed fluid from said plurality of cylinders, a cylinder head provided on said valve plate, said cylinder head having a partition wall defining a discharge chamber, a discharge valve member provided on said valve plate, said discharge valve member having a plurality of discharge valves each covering each of said plurality of outlet ports to open and close each of said plurality of outlet ports, and a valve guard member provided in said discharge chamber, the improvement comprising:
the outline of the fringe of said valve guard member being formed along the inner side surface of said partition wall;
wherein said partition wall is wave-shaped in plane.

2. A multicylinder compressor as recited in claim 1 wherein said outline of the fringe of said valve guard member is formed maintaining a substantially constant distance between said outline of the fringe of said valve guard member and said inner side surface of said partition wall.

3. A multicylinder compressor as recited in claim 1 wherein said outline of the fringe of said valve guard member is formed analogous to the shape defined by said inner side surface of said partition wall.

4. A multicylinder compressor as recited in claim 1 wherein said partition wall is wave-shaped in plane.

5. The multicylinder compressor of claim 1, said valve guard member and said discharge valve having different shapes.

6. The multicylinder compressor of claim 1, said valve guard member having at least one constriction portion.

7. A multicylinder compressor as recited in claim 1 wherein said valve guard member has a center hole for fixing said valve guard member to said valve plate.

8. A multicylinder compressor as recited in claim 1 wherein said cylinder head is mounted on said cylinder block via a gasket.

9. The multicylinder compressor of any of claims 7-8, wherein the valve guard member is attached to the valve plate in the discharge chamber.

10. In a multicylinder compressor comprising a cylinder block having a plurality of cylinders arranged parallel to each other, a valve plate provided on an end of said cylinder block, said valve plate including a plurality of outlet ports for discharging a compressed fluid from said plurality of cylinders, a cylinder head provided on said valve plate, said cylinder head having a partition wall defining a discharge chamber, a discharge valve member provided on said valve plate, said discharge valve member having a plurality of discharge valves each covering each of said plurality of outlet ports to open and close each of said plurality of outlet ports, and a valve guard member provided in said discharge chamber, the improvement comprising:
the outline of the fringe of said valve guard member being formed along the inner side surface of said partition wall;
wherein the outline of the fringe of said valve guard member is formed with a substantially constant distance between said outline of the fringe of said valve guard member and said inner side surface of said partition wall.

11. A multicylinder compressor having a cylinder block with a plurality of cylinders arranged parallel to each other, comprising:
a) a valve plate provided on an end of the cylinder block, the valve plate including a plurality of outlet ports for discharging a compressed fluid from the plurality of cylinders;
b) a cylinder head provided on the valve plate, the cylinder head having a partition wall defining a discharge chamber;
c) a plurality of discharge valves on the valve plate; and
d) a valve guard provided in the discharge chamber, wherein the outline of the fringe of the valve guard is substantially parallel to the inner side surface of the partition wall.

12. The multicylinder compressor of claim 11, wherein the valve guard is attached to the valve plate in the discharge chamber.

13. A multicylinder compressor having a cylinder block with a plurality of cylinders arranged parallel to each other, comprising:
a) a valve plate provided on an end of the cylinder block, the valve plate including a plurality of outlet ports for discharging a compressed fluid from the plurality of cylinders;
b) a cylinder head provided on the valve plate, the cylinder head having a partition wall defining a discharge chamber;
c) a plurality of discharge valves on the valve plate; and
d) a valve guard provided in the discharge chamber, wherein the outline of the fringe of the valve guard follows the inner side surface of the partition wall.

14. The multicylinder compressor of claim 13, wherein the valve guard is attached to the valve plate in the discharge chamber.

15. A multicylinder compressor having a cylinder block with a plurality of cylinders arranged parallel to each other, comprising:
a) a valve plate provided on an end of the cylinder block, said valve plate including a plurality of outlet ports for discharging a compressed fluid from the plurality of cylinders;
b) a cylinder head provided on said valve plate, said cylinder head having a partition wall defining a discharge chamber;
c) a plurality of discharge valves on said valve plate; and
d) a valve guard attached to the valve plate in the discharge chamber, said valve guard having at least two radii including a first maximum radius and a second minimum radius, the first maximum radius of said valve guard being defined by an outer periphery thereof and the second minimum radius of said valve guard being defined by an inwardly extending portion of said valve guard, wherein the length of the second minimum radius of said valve guard is greater than one-half of the length of the first maximum radius of said valve guard.

16. The multicylinder compressor of claim 15, further comprising at least one construction portion, said at least one constriction portion defining the second minimum radius of said valve guard.

17. In a multicylinder compressor comprising a cylinder block having a plurality of cylinders arranged parallel to each other, a valve plate provided on an end of said cylinder block, said valve plate including a plurality of outlet ports for discharging a compressed fluid from said plurality of cylinders, a cylinder head provided on said valve plate, said cylinder head having a partition wall defining a discharge chamber, a discharge valve member provided on said valve plate, said discharge valve member having a plurality of discharge valves each covering each of said plurality of outlet ports to open and close each of said plurality of outlet ports, and a valve guard member provided in said discharge chamber, the improvement comprising:

the outline of the fringe of said valve guard member being formed along the inner side surface of said partition wall;

wherein the outline of the fringe of said valve guard member is formed analogous to the shape defined by said inner side surface of said partition wall.

18. A multicylinder compressor having a cylinder block with a plurality of cylinders arranged parallel to each other, comprising:
 a) a valve plate provided on an end of said cylinder block;
 b) a cylinder head provided on said valve plate opposite said cylinder block;
 c) a wave-shaped partition wall depending from said cylinder head and extending to said valve plate;
 d) a discharge chamber defined by at least said partition wall, said valve plate and said cylinder head; and
 e) a valve guard member disposed in said discharge chamber, said valve guard member having an outer surface substantially corresponding to said partition wall.

19. The multicylinder compressor of claim 18, further comprising an inlet chamber, said inlet chamber disposed outside said partition wall.

20. The multicylinder compressor of claim 18, said valve guard member having at least one constriction portion.

* * * * *